United States Patent [19]

Lee

[11] Patent Number: 5,485,329
[45] Date of Patent: Jan. 16, 1996

[54] DEVICE FOR INSERTING/EXTRACTING A DISK CARTRIDGE WITH LOCKING MECHANISM

[75] Inventor: Min-su Lee, Suwon, Rep. of Korea

[73] Assignee: Samsung Electronics Co., Ltd., Kungki-do, Rep. of Korea

[21] Appl. No.: 250,456

[22] Filed: May 27, 1994

[30] Foreign Application Priority Data

Jun. 1, 1993 [KR] Rep. of Korea .................. 93-9796

[51] Int. Cl.$^6$ .................. G11B 17/04; G11B 5/016
[52] U.S. Cl. .................. 360/99.06; 360/99.02; 369/77.2
[58] Field of Search .................. 360/99.02, 96.5, 360/99.06, 96.6; 369/75.1, 75.2, 77.1, 77.2, 79

[56] References Cited

U.S. PATENT DOCUMENTS

| | | | |
|---|---|---|---|
| 4,686,594 | 8/1987 | Kurafuji | 360/99.02 |
| 4,750,063 | 6/1988 | Kume et al. | 360/99.02 |
| 5,355,357 | 10/1994 | Yamamori et al. | 369/75.2 |
| 5,359,478 | 10/1994 | Kawano | 360/99.06 |

FOREIGN PATENT DOCUMENTS

| | | | |
|---|---|---|---|
| 60-214449 | 10/1985 | Japan | 360/99.02 |
| 61-227261 | 10/1986 | Japan | 369/77.2 |

*Primary Examiner*—Stuart S. Levy
*Assistant Examiner*—Brian E. Miller
*Attorney, Agent, or Firm*—Sughrue, Mion, Zinn, Macpeak & Seas

[57] ABSTRACT

A device for inserting and extracting a disk cartridge for use in a disk player, includes a locking member slidably installed on a cartridge holder for performing a locking/release function; a locking release member one end of which is rotatably installed on the deck having a center of rotation above that of the cartridge holder, so that the other end is interlocked with the cartridge holder to release a locking state of the locking member; and an extracting member being rotatably installed on the cartridge holder and having one end locked by the locking member. A lift on the extracting member lifts the locking release member. A cartridge is inserted or withdrawn from the cartridge holder when the cartridge holder and the locking release member are pivoted upward away from the deck of the player. No motor is used for insertion and withdrawal.

7 Claims, 6 Drawing Sheets

DEVICE FOR INSERTING/EXTRACTING A DISK CARTRIDGE WITH LOCKING MECHANISM

BACKGROUND OF THE INVENTION

The present invention relates to a device for inserting and extracting a disk cartridge for a recording/playback disk player.

The development of magnetooptical disk cartridges of a 64 mm diameter (commercially referred to as "minidisks") has been under way since the minidisk was first introduced (by Sony of Japan). Portable players, for recording and playing back information on minidisks, are currently commercially available (Sony model MZ-1). The commercially available player has a slot into which a minidisk is inserted. A minidisk cartridge is loaded onto the deck by the driving force of a motor, with the shutter of the cartridge being moved aside to open a communicating aperture, and is mounted on a turntable rotated by a spindle motor.

In general, it is desirable that a portable player be as light and small as possible, allow the rapid insertion/extraction of a disk cartridge, and have a very low rate of power consumption. However, due to the specific construction of the insertion means, i.e., via a slot, the Sony minidisk player has a complicated structure for insertion/extraction of the cartridge. Further, due to limitations determined by a motor, it is difficult to miniaturize and reduce the weight of the player and to speed up the inserting and extracting operations thereof. That is, a motorized apparatus is used to insert and/or draw out the minidisk, which thereby increases the player's overall power consumption. Accordingly, battery power is not efficiently utilized.

SUMMARY OF THE INVENTION

Therefore, it is an object of the present invention to provide in a disk player, a device for inserting and withdrawing a disk cartridge, wherein the insertion and withdrawal of the disk cartridge are performed without the use of a motor and with a reduced number of components. By eliminating the motor, the disk cartridge may be rapidly inserted or withdrawn, the power consumption is reduced, and lower production costs result.

To accomplish the object of the present invention, there is provided in a disk player, a device for inserting and extracting a disk cartridge, comprising: a cartridge holder, one end of which is hinged on a deck so as to rotate; locking means slidably installed on the cartridge holder for performing a locking/release function; locking release means, one end of which is rotatably installed on the deck having a center of rotation above that of the cartridge holder, so that the other end is interlocked with the cartridge holder to release a locking state of the locking means; and extracting means being rotatably installed on the cartridge holder and having one end locked by the locking means, a portion for raising the locking releasing means, and the other end for extracting an inserted disk cartridge when released by the locking release means.

BRIEF DESCRIPTION OF THE DRAWINGS

The above object and advantages of the present invention will become more apparent from the following description of a preferred embodiment thereof with reference to the attached drawings in which.

DETAILED DESCRIPTION OF THE INVENTION

Figure 1:
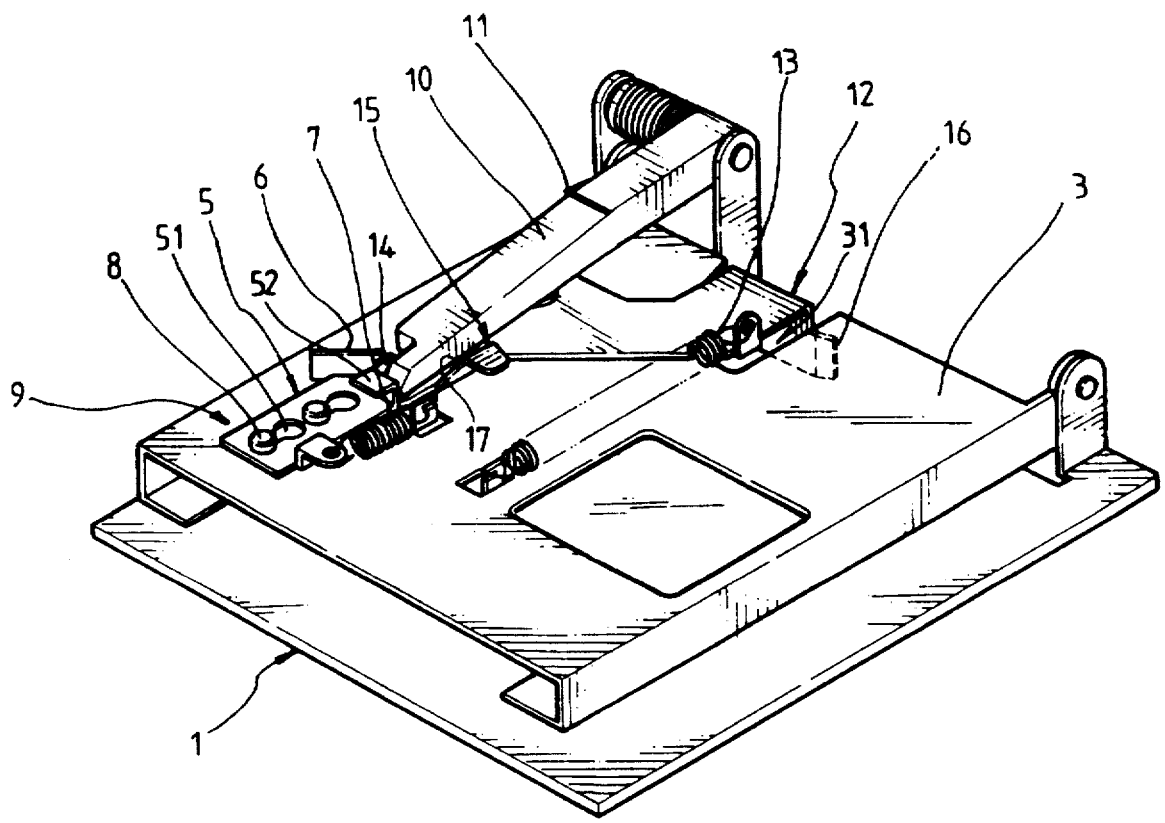
FIG. 1 is a perspective view of a device for inserting and extracting a disk cartridge according to the present invention.
Figure 2:
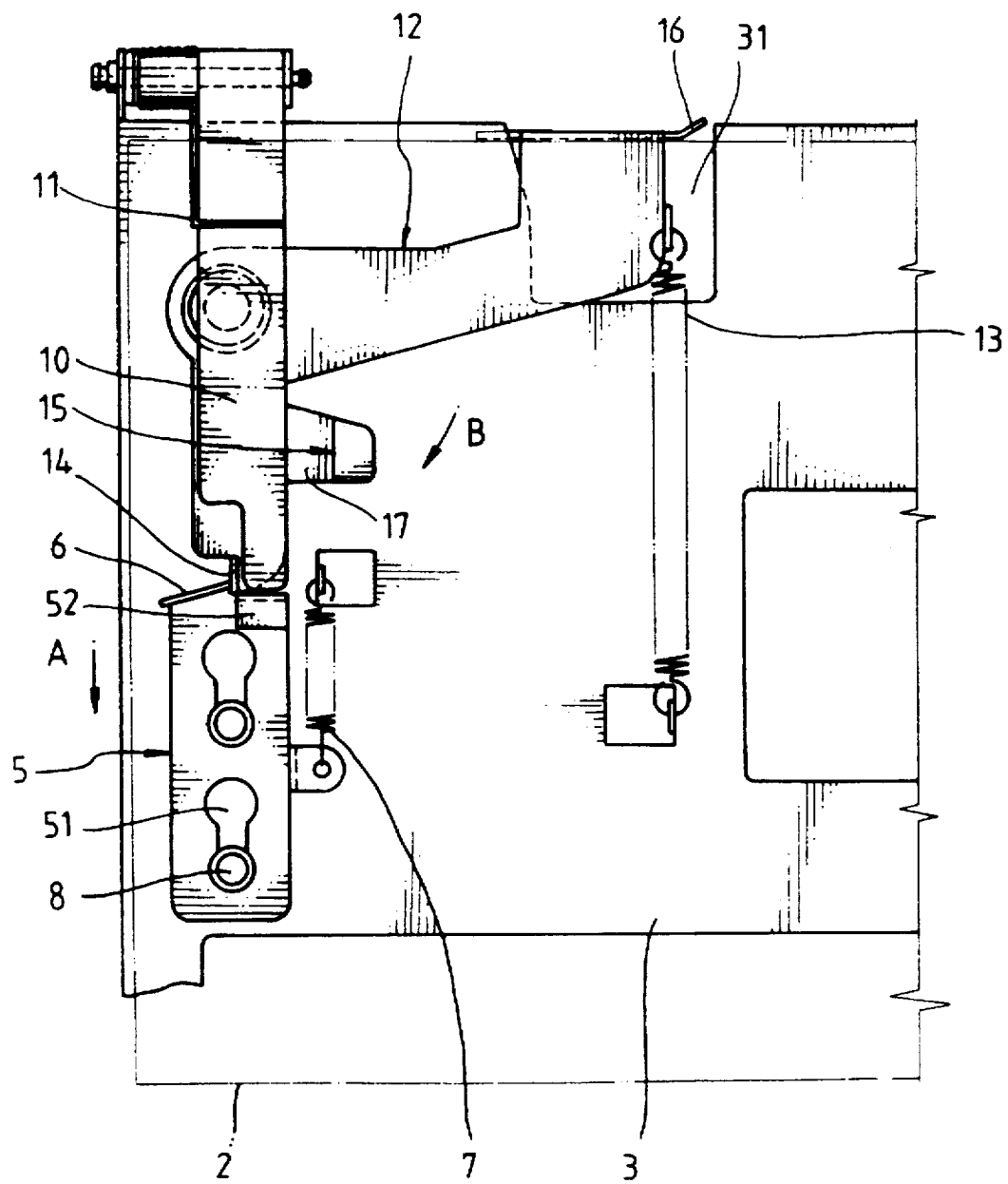
FIG. 2 is a plan view of the device of FIG. 1.
Figure 3:
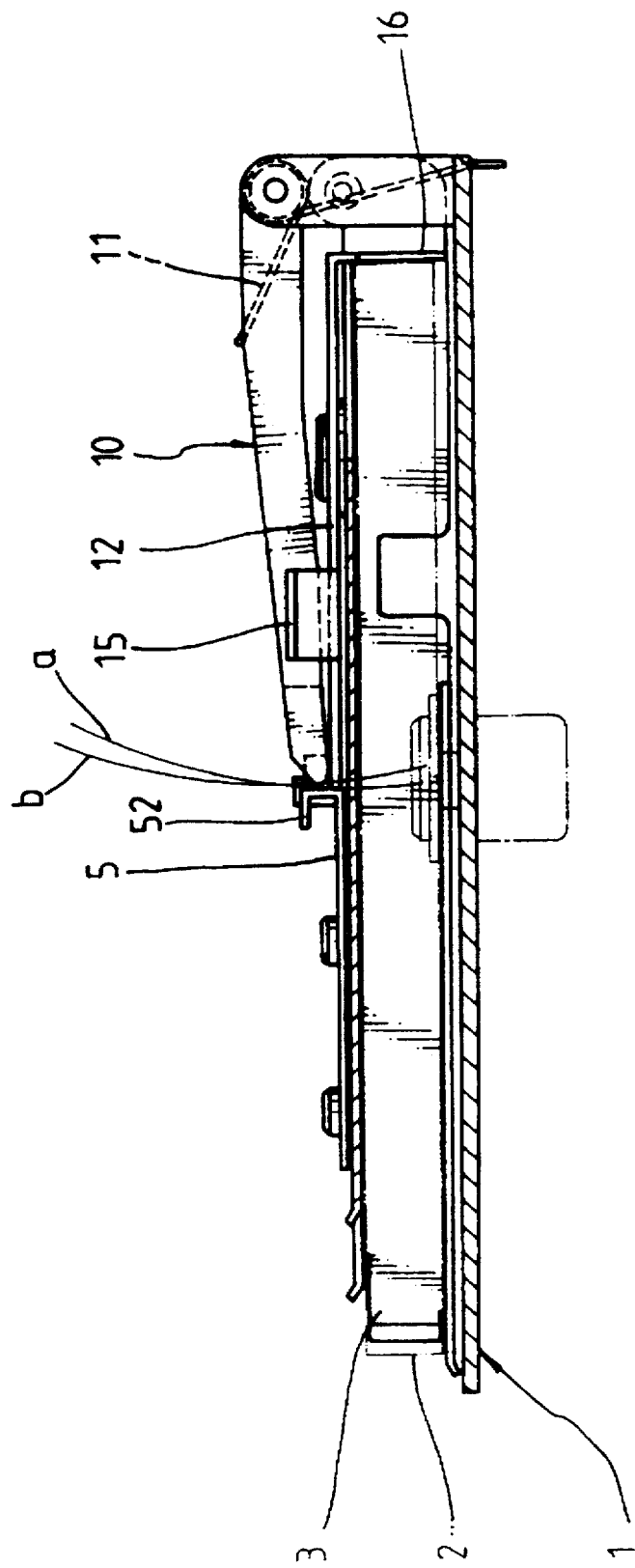
FIG. 3 is a side sectional view of FIG. 2.

Referring to FIGS. 1, 2 and 3, a cartridge holder 3 into which a disk cartridge 2 may be inserted, is hinged on deck 1 at the rear of the cartridge holder 3 to permit pivoting about the hinged part. A locking member 5 having a stop 6 on one side thereof is installed on cartridge holder 3 to enable it to move rectilinearly via a guiding device 9. The locking member 5 is elastically biased toward the insertion direction of the disk cartridge by a first spring 7. The guiding device 9 consists of a guide pin 8 placed on cartridge holder 3 and an elongated guide hole 51 formed in locking member 5 for allowing the guide pin 8 to be slidably connected to locking member 5. Stop 6 provided on locking member 5 is formed as a sloped surface to facilitate the locking of projection 14 of an extracting member 12.

A locking release member 10 is installed to have a center of rotation or hinge center directly above the hinge center of the cartridge holder 3 and parallel therewith, such that one end of the locking release member 10 is rotatable about its hinge center. A second spring 11, placed at the center of rotation of the locking member 10, elastically biases the locking release member toward cartridge holder 3.

Extracting member 12 is hinged on cartridge holder 3 to permit rotation thereof in a plane parallel to the surface of the cartridge holder 3. The extracting member 12 is biased to rotate in the clockwise direction (the extracting direction for a disk cartridge 2) by a third spring 13 anchored between extracting member 12 and cartridge holder 3.

Extracting member 12 includes a projection 14, which abuts the stop 6 of locking member 5 when the locking member 5 is in the position shown in FIGS. 1–3, whereby the stop 6 prevents rotation of the extracting member 12 in the clockwise direction. The extracting member 12 also includes a lift 15 having a slope 17 for raising locking release member 10 and separating it from locking member 5 when disk cartridge 2 is to be drawn out. An extracting piece 16 located at the rear of the extracting member 12 is bent downward and moves within a guide recess 31 of the cartridge holder. When the stop 6 no longer stops the projection 14 of extraction member 12, the extraction member 12 rotates clockwise (as seen from above in FIGS. 1–3) to push the disk cartridge 2 out of the cartridge holder 3, thereby permitting the disk cartridge to be completely withdrawn from the cartridge holder.

The device for inserting and extracting a disk cartridge for a disk player of the present invention operates in accordance with the following description.

First, FIGS. 2 and 3 illustrate the condition where the cartridge holder 3 has a disk cartridge 2 fully inserted therein and is in the down position (i.e., not pivoted up as in FIGS. 5 and 6) on deck 1. The projection 14 of extracting member 12 abuts against the stop 6 of locking member 5. In this state, the non hinged end of locking release member 10 is in contact with extracting member 12 and pushes against a locking release piece 52. The position of locking release member 10 is held by second spring 11. Also, the fact that locking release member 10 has a pivot point directly above the pivot point of cartridge holder 3 results in member 10 and holder 3 having different rotation loci. The difference between the rotation locus "a" of the cartridge holder 3 and the rotation locus "b" of locking release member 10 also causes the end of locking release member 10 to push against locking release piece 52, when the device is in the state shown in FIGS. 1–3. When the cartridge 2 is loaded into the holder 3 and the holder 3 is in the position shown, loading is complete and a playback operation can be performed.

Figure 4:
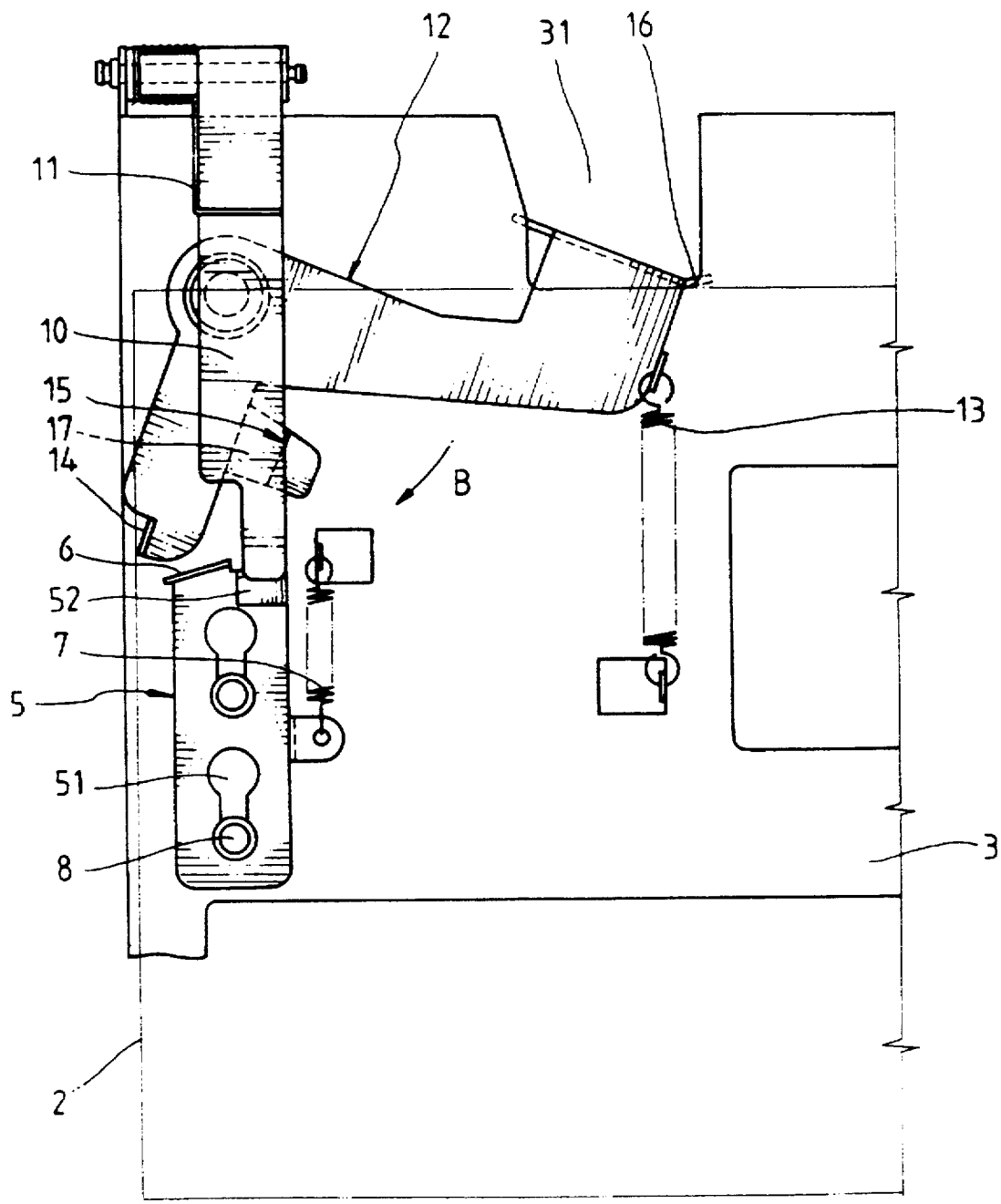
FIG. 4 is a plan view of the device of FIG. 1 in the state whereby a disk cartridge is being pushed out of or inserted into the device.
Figure 5:
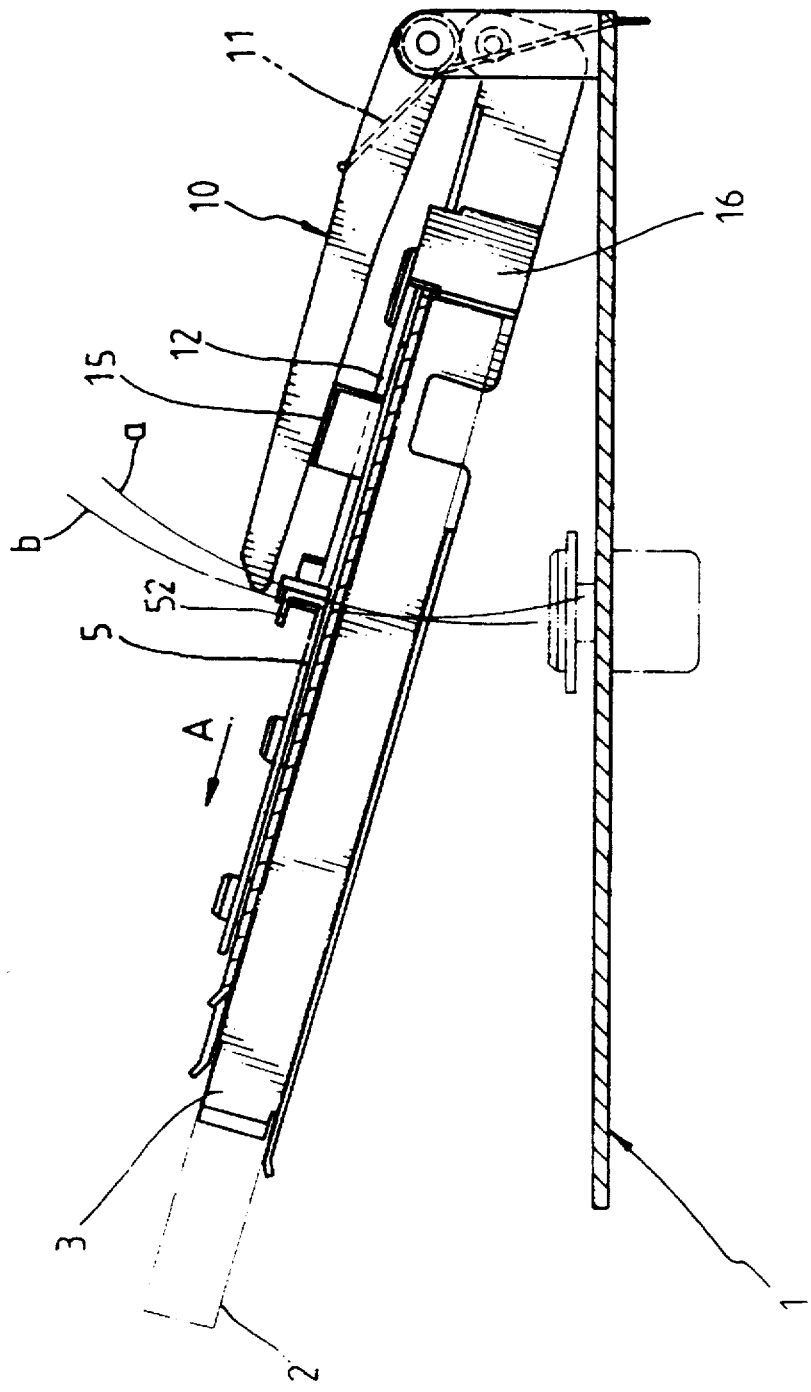
FIG. 5 is a side sectional view of the device of FIG. 1 in the state wherein the disk holder is raised from the deck and a disk cartridge is only partially inserted or partially withdrawn.

To place the cartridge holder 3 in a position for insertion or withdrawal of a disk cartridge, the cartridge holder 3 and the locking release member 10 are rotated upward about their respective hinges to the positions shown in FIG. 5. Since the center of rotation of the cartridge holder 3 is directly below that of the locking release member 10, as the two rotate upward, the end of locking release member 10 pushes locking member 5 in the "A" direction. This is the result of the differences between rotation locus "a" of cartridge holder 3 and rotation locus "b" of locking release member 10. When locking member 5 is pushed sufficiently in the direction A, the stop member moves away from the position where it stops or locks the projection 14 on the extracting member 12. As shown in FIG. 4, the extracting member now becomes free to rotate counterclockwise in the direction of arrow B. As extracting member 12 rotates in the "B" direction due to the resilient force of the third spring 13, the extracting piece 16 of extracting member 12 pushes the disk cartridge 2 partly out of the cartridge holder 3.

Also, when extracting member 12 rotates in the direction B, the locking release member 10 is raised upward from contact with locking release piece 52 by the action of the slope 17 of lift 15. As a result, the locking member 5 is free to slide in the direction opposite to direction A under the force of the first spring 7.

Figure 6:
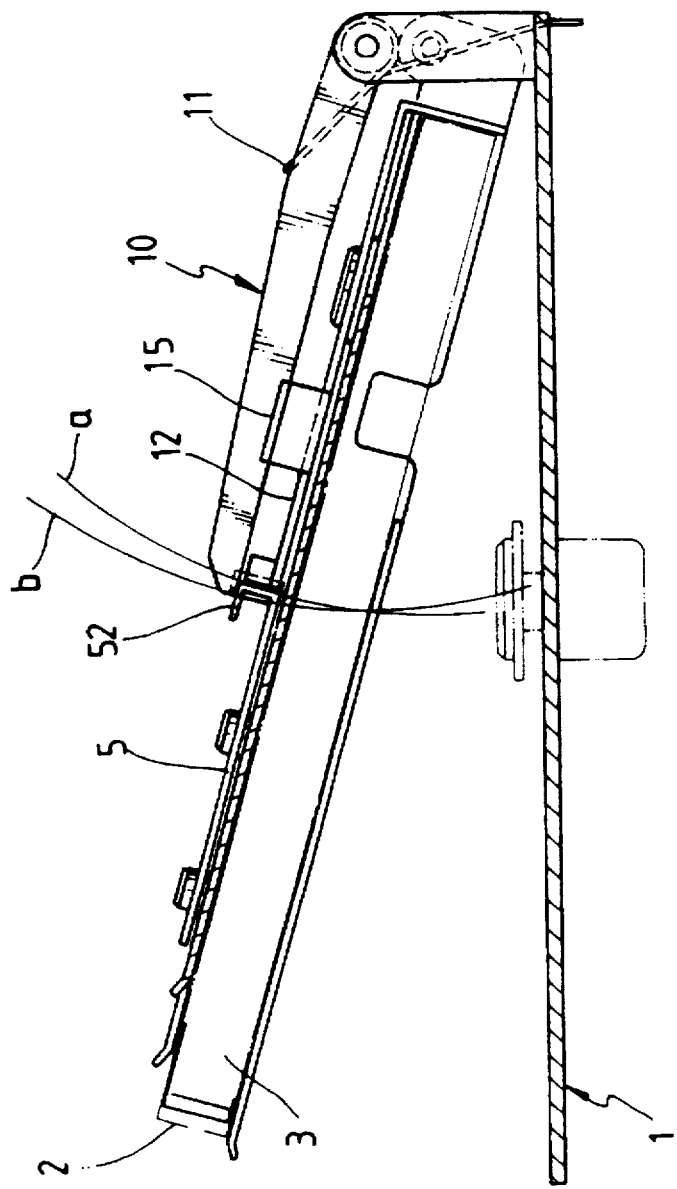
FIG. 6 is a side sectional view of the device of FIG. 1 in the state wherein the disk holder is raised from the deck and a disk cartridge is fully inserted within the cartridge holder.

Referring to FIGS. 4, 5 and 6, which illustrate the state in which cartridge holder 3 is raised above the deck, when a disk cartridge 2 is fully inserted into cartridge holder 3, the insertion end of the cartridge pushes the extracting piece 16 to cause the extracting member 12 to rotate in the counter-clockwise direction (the direction opposite that of direction "B"). Then, projection 14 of extracting member 12 slides on the slope of stop 6 and pushes the locking member back in the direction A. The projection 14 moves along the slope of stop 6 until it passes the end thereof, at which time it becomes locked once again by the stop 6 from rotating clockwise. Also, as the projection 14 and the extracting member 12 are rotating counter clockwise under the pressure from the inserted cartridge, the lift 15 moves away from contact with the locking release member 10. When the latter occurs, the force of second spring 11 brings locking release member 10 down so that the front of locking release member 10 contacts the locking release piece 52 as shown in FIG. 6. As can be seen, at this time the locking release member 10 contacts the top rather than the front of the locking release piece 52.

When cartridge holder 3 is lowered after the disk cartridge has been fully inserted, the relation of the locking release member 10 and the locking release piece 52 changes from that in FIG. 6, where the member 10 sits on top of piece 52, to that of FIG. 3, where the member 10 abuts the front of piece 52. This change is due to the difference between the aforementioned rotation loci ("a" and "b") of the locking release member 10 and the cartridge holder 3 (specifically the locus of the piece 52 on the cartridge holder 3).

The movement of the cartridge holder from the "play" position of FIG. 1 to the insertion/withdrawal position of FIGS. 5 and 6 is accomplished manually in the preferred embodiment. As the cartridge holder is rotated (or pivoted) through manual force, the locking member 5, the locking release member 10, and the extraction member 12 operated automatically as described above.

As described above, the device for inserting and extracting a disk cartridge for a disk player of the present invention performs insertion and withdrawal of a disk cartridge without a motor. Instead the insertion/withdrawal device uses the engagement of a locking member, a locking release member and an extracting member. Therefore, as compared with the conventional apparatus using power transmission members such as a motor and gears, the present invention reduces the number of components, thereby simplifying the structure and the assembling process. This reduces production costs and results in a device which enables more rapid insertion and withdrawal of a disk cartridge.

What is claimed is:

1. A device for inserting and extracting a disk cartridge for use in a disk player having a deck; said device comprising:

a cartridge holder pivotally attached at one end thereof to said deck to enable rotation of said cartridge holder between a down position for playing disks in said cartridge and an up position for insertion and withdrawal of the disk cartridge into and from said cartridge holder;

an extracting member rotatably installed on said cartridge holder; said extracting member having an extracting piece at one end thereof; said extracting piece being positioned to push an inserted cartridge outwardly with respect to said cartridge holder as said extracting member rotates in a first direction;

a locking member slidably installed on said cartridge holder to slide rectilinearly between a first position which holds said extracting member in a locked position stopping rotation of said extracting member in said first direction, and a second position which does not hold said extracting member in a locked position; and a locking release member pivotally installed at one end thereof on said deck for movement between a down position and an up position and having a center of rotation above that of said cartridge holder such that said locking release member and said cartridge holder have different rotation loci; a part of said locking release member at an opposite end thereof engaging said locking member, wherein when said locking release member and said cartridge holder are rotated upward away from said deck and due to the different rotation loci of said locking release member and said cartridge holder, the end of said locking release member engaging said locking member forces said locking member to slide towards said second position and release said extracting member from the locked position, permitting said extracting member to rotate in said first direction;

a first biasing member for biasing said locking member towards said first position;

a second biasing member for biasing said locking release member towards the down position; and a third biasing member for biasing said extracting member towards rotation in said first direction.

2. A device as claimed in claim 1, wherein said first biasing member comprises:

a first spring installed between said locking member and cartridge holder for elastically biasing said locking member in the inserting direction of said disk cartridge; and wherein said locking member further comprises:

a slide plate provided on said deck and slidable between said first and second positions;

a stop member on one end of said slide plate; said stop member stopping the movement of said extracting member when the slide member is in said first position;

a locking release piece at said one end of said slide plate; said locking release piece coming into contact with said part of said locking release member; whereby when said cartridge holder and said locking release member are rotated upward away from said deck, said part pushes on said locking release piece against the force of said first spring to push said slide plate towards said second position to move said stop member away from the position where it stops movement of said extracting member.

3. A device as claimed in claim 2, wherein said second biasing member comprises:

a second spring having one end connected to said locking release member and the other end connected to one of said cartridge holder and deck for elastically biasing said locking release member in the direction of said cartridge holder.

4. A device as claimed in claim 3, wherein said extracting member further includes:

a projection formed on an end of said extracting member opposite the end where said extracting piece is formed; said projection abutting and being locked by said stop member when said extracting member is fully rotated in a direction opposite to said first direction and said slide plate is in said first position;

a lift member formed on said extracting member for pivoting said locking release member upwards when said extracting member rotates in said first direction under the force of said third biasing member.

5. A device as claimed in claim 4, wherein said third biasing member comprises:

a third spring connected at one end to said extracting member and at the other end to said cartridge holder for biasing said extracting member to rotate in said first direction.

6. A device as claimed in claim 5, wherein said extracting piece is a bent piece at one end of said extracting member and moves between a first position at the back of said cartridge holder, when said extracting member is locked by said locking member, and a second position substantially into said cartridge holder, when said extracting member has rotated in said first direction.

7. A device as claimed in claim 6, wherein said stop member has a slanted surface, whereby when said extracting piece is pushed to the back of said cartridge holder by insertion of a cartridge therein, the force of said pushing also pushes said projection against said slanted surface of said stop member to force said slide plate to move toward said second position, allowing said extracting member to rotate fully in the direction opposite said first direction, and wherein said projection passes said slanted surface, allowing said first spring to force said slide plate back to said first position thereby locking said extracting member by the engagement of said projection and said stop member.

* * * * *